(12) United States Patent
Hidaka et al.

(10) Patent No.: US 6,484,571 B1
(45) Date of Patent: Nov. 26, 2002

(54) SURFACE CONFIGURATION MEASURING METHOD

(75) Inventors: Kazuhiko Hidaka, Tsukuba (JP); Akinori Saito, Tsukuba (JP); Kiyokazu Okamoto, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 113 days.

(21) Appl. No.: 09/624,908

(22) Filed: Jul. 24, 2000

(30) Foreign Application Priority Data

Jul. 23, 1999 (JP) .......................................... 11-209618

(51) Int. Cl.$^7$ ............................ G01B 7/00; G01B 7/34; G01B 21/00; G01B 21/20
(52) U.S. Cl. ............................. 73/105; 33/503; 33/504; 33/551; 33/553; 33/554; 33/556; 33/558; 33/559; 33/561
(58) Field of Search ..................... 73/104, 105; 33/503, 33/504, 550, 549, 551, 553, 554, 555, 556, 557, 558, 559, 560, 561; 250/306

(56) References Cited

U.S. PATENT DOCUMENTS 5,058,433 A * 10/1991 Wison et al. ................. 33/556
6,006,593 A * 12/1999 Yamanaka .................... 73/105
6,094,971 A * 8/2000 Edwards et al. ............... 73/105
6,223,591 B1 * 5/2001 Nakano ........................ 73/105

FOREIGN PATENT DOCUMENTS

JP 6-221806 8/1994 .................. 33/561
JP 00-55643 2/2000 .................. 33/561

* cited by examiner

Primary Examiner—Daniel S. Larkin
(74) Attorney, Agent, or Firm—Webb Ziesenheim Logsdon Orkin & Hanson, P.C.

(57) ABSTRACT

A surface configuration measuring method is provided, the surface configuration measuring method being characterized in having the steps of: moving a touch signal probe by a command velocity vector to touch a surface of the workpiece to be measured; scanning the surface of the workpiece to be measured, the touch signal probe being moved along the surface to be measured while controlling the distance relative to the surface to be measured so that detected amplitude value of a detection signal outputted by the detecting circuit becomes a predetermined reference value, thus outputting the detected amplitude value and corresponding measuring position; and calculating an estimated surface position based on the detected amplitude value and the measuring position estimated to be obtained when surface is scanned to keep the detected amplitude value constant.

12 Claims, 12 Drawing Sheets

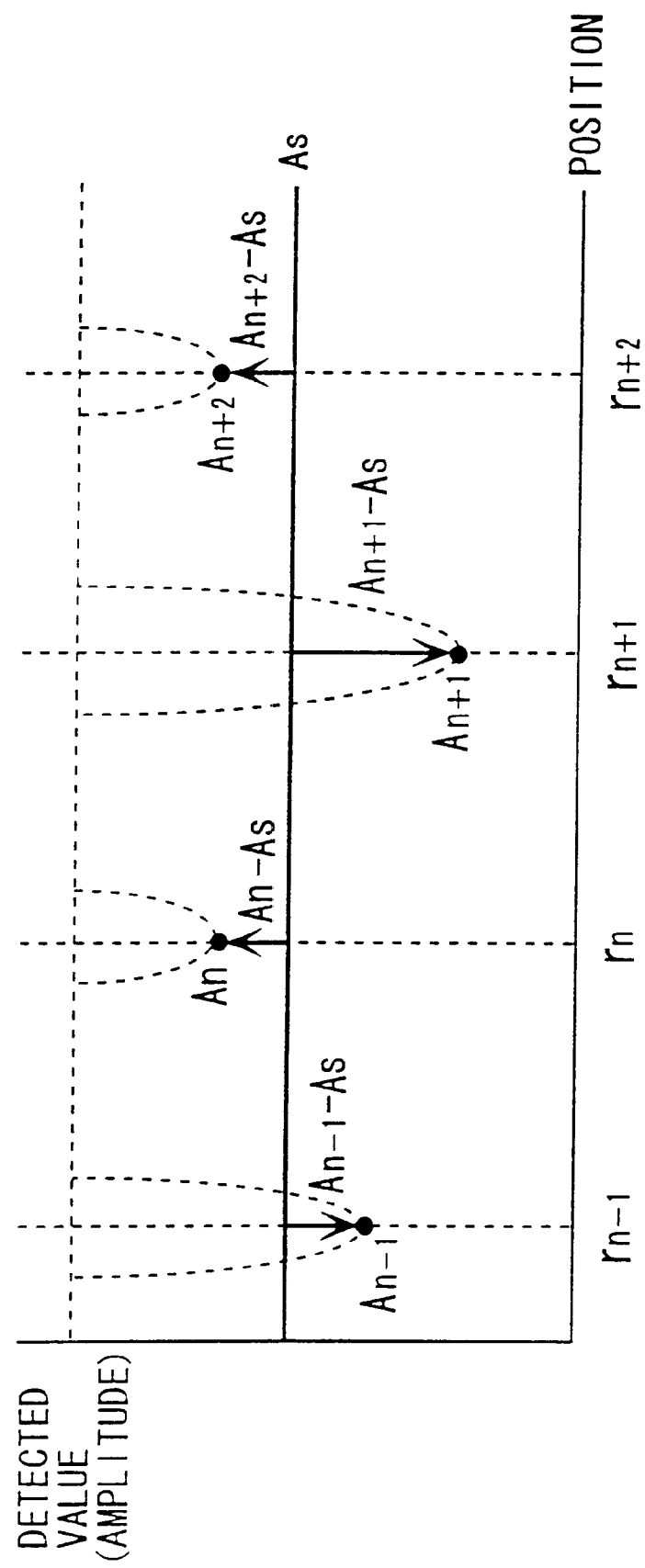

SURFACE CONFIGURATION MEASURING METHOD

BACKGROUND OF THE INVENTION

1. Field of the Invention

The present invention relates to a method for measuring the surface configuration of a workpiece by a contact-type probe attached to a coordinates measuring machine, etc. More specifically, the present invention relates to improvement in measurement efficiency and accuracy with use of contact detection probe vibrated by ultrasonic wave.

2. Description of Related Art

A height gauge (one-dimensional measuring machine), a coordinates measuring machine, and a profile measuring machine are known for measuring the configuration and/or dimension of a workpiece. Various probes are used by these measuring machines in order to detect the positional relation between the measuring machine and the workpiece. The probes are classified into non-contact type probes and contact type probes, continuously measuring probes, and contact detection probes (touch trigger probes), etc.

A touch signal probe vibrated by ultrasonic waves disclosed in Japanese Patent Laid-Open Publication No. Hei 6-221806 is known as a contact detection probe used for a coordinates measuring machine. The contact type vibrating probe disclosed in this publication has a stylus having a contact portion to be in contact with a workpiece at a tip end thereof, a stylus holder for supporting the stylus, a vibrator for resonating the stylus in an axial direction thereof by applying ultrasonic vibration, and a detector for detecting a change in the stylus's vibration by the vibrator.

According to the touch signal probe, since the vibration status of the stylus changes when the tip end of the stylus touches a surface of the workpiece, the surface position of the workpiece can be detected by the detector.

Such a touch signal probe vibrated by an ultrasonic wave is sometimes used for measuring the diameter of a small hole etc. For measuring small holes, another touch signal probe shown in U.S. patent application Ser. No. 09/366,774 has been proposed as a small size touch signal probe vibrated by ultrasonic wave.

As shown in FIG. 12, the touch signal probe 100 has a stylus holder 101, a stylus 102, a vibrator 103A, and a detector 103B. A contact portion 102A to be in contact with the workpiece is provided at an end of the stylus 102 and a counter balance 102B is provided at a base end of the stylus 102. When the stylus 102 vibrates in an axial direction thereof, the centroid position becomes a node of vibration.

In the touch signal probe 100, the stylus 102 is composed of a thin stick member and the contact portion 102A composed of a small sphere in line with the stylus 102 to enable small hole measurement. Further, since the thin stylus 102 is difficulty to support at one point, the stylus holder 101 supports the stylus 102 at two points sandwiching the centroid position of the stylus 102.

The vibrator 103A and the detector 103B are made by dividing a piezoelectric element 103 stretching over the two supporting portions of the stylus holder 101. When the stylus 102 resonates along the axial direction by the vibrator 103A, the node of vibration is caused at the centroid position of the stylus 102. The supporting portions of the stylus 102 of the stylus holder 101 sandwich the node of vibration.

According to the touch signal probe 100, since the stylus holder 101 supports the stylus 102 at the two portions sandwiching the node of vibration, the stylus 102 can be supported by the stylus holder 101 even when the stylus 102 is made from an extremely thin stick member, thus enabling the inner surface measurement of a small hole having a large aspect ratio.

On the other hand, another method for touching the surface of the workpiece by vibration movement ("tapping method") has been proposed (e.g. U.S. patent application Ser. No. 09/540,051).

According to the above method, a second vibrator is provided to, for instance, the above-described stylus holder 101 and the stylus 102 is vibrated by the second vibrator, so that the contact portion 102A at the tip end vibrates toward and away from the workpiece.

According to this tapping method, even when the stylus 102 moves along the surface of the workpiece to measure the surface configuration continuously, since the contact portion 102A moves toward and away from the workpiece, dragging (adhesion phenomenon) by the workpiece can be avoided even with the stylus 102 having less rigidity. Therefore, the method is advantageous in that work efficiency can be improved by the continuous measurement while maintaining high accuracy.

However, measurement accuracy is largely influenced by a timing for outputting trigger of contact detection in the above-described touch signal probe vibrated by ultrasonic wave.

Specifically, when the stylus vibrated by the vibrator moves toward the workpiece and the contact portion touches the surface of the workpiece, vibration starts to be restrained when contact is initiated. When the contact portion further moves toward the workpiece and the contact portion touches the surface of the workpiece with a certain pressing force, the vibration of the stylus is further restrained. At this time, since the pressing condition toward the workpiece surface and restraint of the vibration are interrelated, the force of the stylus toward the workpiece can be made constant by sensing that the restraint of the vibration reaches a predetermined level by monitoring the output signal of the detector, so that accurate position detection is possible.

However, for measuring a position of one point on the surface of the workpiece, it is necessary to repeatedly move the stylus toward and away from the workpiece detecting when the vibration of the stylus is settled at the position. An enormous total amount of work time may be required for checking numerous points when, for instance, continuously measuring the surface of the workpiece.

On the other hand, the work time can be shortened for measuring respective positions of the workpiece if the vibration of the stylus is not strictly settled at the position but, settled only to a predetermined level. However, in this case, measurement accuracy naturally deteriorates.

SUMMARY OF THE INVENTION

An object of the present invention is to provide a surface configuration measuring method for avoiding the influence of convergence time at each contact point on the workpiece while detecting contact by vibration, thereby improving work efficiency while maintaining high measurement accuracy.

The present invention focuses on the fact that, in the conventional contact detection by vibration, the stylus is moved to a position where the vibration of the stylus reaches a predetermined level, and position information of the stylus at the position is read to obtain contact position. The time to take the troublesome steps for minutely moving the stylus toward and away from the workpiece is known as the convergence time. In the present invention, the stylus is not settled to a predetermined position, but a coordinate of the predetermined position conventionally to be settled is calculated by the detected value of the detector obtained adjacent to the predetermined position and the detected position of the stylus, thus measuring the position of the surface of the workpiece with high accuracy and efficiency.

More specifically, the present invention is a surface configuration measuring method for measuring a surface configuration of a workpiece using a contact detection probe comprising: a support body for moving in a three-dimensional space by a predetermined command velocity vector based on an outside command; a stylus being supported by the support body and having a contact portion to be in contact with the workpiece; a vibrator for resonating the stylus at a first frequency f1 in an axial direction; and a detecting circuit for detecting change in vibration of the stylus by the vibrator, the surface configuration of the workpiece being measured by a position of the support body when the contact portion touches the surface of the workpiece, the surface configuration measuring method being characterized in having the steps of:

moving the contact detection probe by the command velocity vector to touch the surface of the workpiece to be measured;

scanning the surface of the workpiece to be measured, wherein the contact detection probe is moved along the surface to be measured while controlling the distance relative to the surface to be measured so that the detected amplitude value $A_n$ of a detection signal outputted by the detecting circuit becomes a predetermined reference value $A_s$, thus outputting the detected amplitude value $A_n$ and corresponding measuring position $r_n$; and calculating estimated surface position $R_n$ from a set of the detected amplitude value $A_0 \sim A_m$ and a set of the measuring position $r_0 \sim r_m$.

As the contact detection probe, the above-described touch signal probe vibrated by ultrasonic wave, etc. can be used. The stylus may preferably be held by a stylus holder connected to the support body. An existing driving element, such as piezoelectric element, can be used as the vibrator. A power source or driving circuit may be connected to an outside source for actuating the vibrator. The detector may be composed of a piezoelectric element and the existing structure integrated with the vibrator, etc. may be used as necessary.

The support body may be driven depending upon any existing coordinates measuring machine and the support body may be operated based on a command program executed by an outside controller or a computer system. The outside controller or the computer system may collect the detected amplitude value $A_n$ from the detector, control in accordance with the reference value $A_s$ and calculate the estimated surface position $R_n$.

Collection of detected amplitude value $A_n$ and the measuring position $r_n$ and calculation of the estimated surface position $R_n$ may be conducted in parallel, or alternatively, may be sequentially conducted.

Conducting the steps in parallel means that, while detecting the position of $r_n$, the estimated surface position for the previous several steps is calculated based on the detected amplitude value and the measuring position.

According to the above arrangement, after the stylus touches the surface of the workpiece and the detected amplitude value $A_n$, and the measuring position $r_n$ of respective points are accumulated by scanning the surface, based on which the estimated surface position $R_n$ is calculated.

At this time, though the stylus is controlled to keep the detected amplitude value $A_n$ at the level of the reference value $A_s$ for respective points, and the stylus does not stay on the respective points until the detected amplitude value $A_n$ is settled into the reference value $A_s$, so that conventional convergence time is not required.

On the other hand, since the estimated surface position $R_n$ can be obtained by correcting the measuring position $r_n$ with the detected amplitude value $A_n$, an accurate value can be obtained even when the stylus does not reach the position where the detected amplitude value $A_n$ equals to the reference value $A_s$.

In the present invention, the command velocity vector $V_{n+1}$ during the scanning step may preferably be determined by equalizing a scalar of the vector product of the preceding value of the command velocity vector $V_n$ and a current command velocity vector $V_{n+1}$ with a difference between the detected amplitude value $A_n$ and the reference value $A_s$ multiplied by a predetermined proportionality factor k.

Accordingly, the stylus can be easily and appropriately controlled to move so that the detected amplitude value $A_n$ approximates the reference value $A_s$.

In the present invention, the estimated surface position $R_n$ calculated during the calculating step may preferably be a position determined by, after determining succeeding measuring position $r_{n+1}$ relative to measuring position $r_n$, setting a position starting from the measuring position $r_n$ having magnitude corresponding to the detected amplitude value $A_n$ and being corrected orthogonal with a straight line connecting the succeeding measuring position $r_{n+1}$ and the preceding measuring position $r_{n+1}$.

Accordingly, the estimated surface position $R_n$ can be obtained by an easy calculation and with high accuracy.

Further, the estimated surface position $R_n$ calculated during the calculating step may be defined as a position starting from the measuring position $r_n$ having magnitude corresponding to the detected amplitude value $A_n$ and being corrected orthogonal with a straight line connecting the measuring position $r_n$ and the preceding measuring position $r_{n-1}$.

Accordingly, since the succeeding measuring position $r_{n+1}$ is not required, the detection data can be immediately arithmetically processed.

Further, the estimated surface position $R_n$ calculated during the calculating step may be defined as a position starting from the measuring position $r_n$ having a magnitude corresponding to the detected amplitude value $A_n$ and being corrected in a direction of a perpendicular drawn to a curve defined at least by three points of the measuring position $r_n$ and preceding and succeeding measuring positions $r_{n+1}$, $r_{n-1}$.

According to the above arrangement, the accuracy of the estimated surface position $R_n$ can be further improved.

In the present invention, the estimated surface position $R_n$ may preferably be determined by adding the offset amount D of the contact portion of the stylus relative to the stylus axis with a position corresponding to the detected amplitude value $A_n$.

The offset amount D is, when the contact portion of the stylus is spherical for instance, given as the radius of the contact portion etc., which means that the distance of the actual contact position is added to the position of the stylus axis.

In the present invention, the scanning step of the surface to be measured may preferably be initially completed and all the necessary detected amplitude values $A_n$ and corresponding measuring positions $r_n$ may be sequentially stored during the scanning step, and a set of estimated surface positions $R_0 \sim R_m$ may be obtained based on the stored set of detected values $A_0 \sim A_m$ and set of corresponding measuring values $r_0 \sim r_m$ during the above calculation step. For sequentially storing the detected amplitude value $A_n$ and the corresponding measuring position $r_n$, the above-described outside computer system etc. may be used as necessary.

According to the above arrangement, since the scanning step for detecting the detection values $A_0 \sim A_m$ and the measuring positions $r_0 \sim r_m$ can be independently and sequentially conducted, the control can be simplified as compared to conducting both steps in parallel. Further, since it is not necessary to consider the operation timing of both steps, the operation of respective steps can be adjusted to be the fastest.

In the present invention, the contact detection probe may further have a second vibrator for resonating the stylus crosswise relative to an axis thereof at a second frequency f2, and the detected amplitude value $A_n$ of the detection signal outputted by the detecting circuit may be latched when vibration of the second vibrator is at a predetermined phase and the latched detected amplitude value $A_n$ may be compared with the reference value $A_s$ to be controlled.

Accordingly, the present invention can be applied to the above-described tapping method.

At this time, the stylus may preferably be vibrated by the second vibrator in a direction approximately orthogonal with the axis of the stylus and approximately orthogonal with moving direction of the support body during the scanning step.

Accordingly, when the stylus axis is parallel to a wall surface, the stylus can tap always in approximately perpendicular direction relative to the measurement surface of the workpiece.

In the present invention, the support body may have a tilting driver for rotating and tilting the contact detection probe in a desired attitude and the attitude of the contact detection probe may be controlled in accordance with the configuration of the workpiece by a tilting controller.

Accordingly, the measurement surface of the workpiece and the axis of the contact detection probe can be made parallel, so that the measurement according to the present invention can be easily conducted even when the measurement surface of the workpiece is slanted.

In the above, the tilting driver may preferably be controlled by the tilting controller so that the stylus is vibrated by the second vibrator in the normal direction of the surface of the workpiece to be in contact with the contact portion.

Accordingly, even when the measurement surface of the workpiece is slanted, accurate measurement is possible by tapping in the normal direction.

Incidentally, for adjusting the attitude of the contact detection probe, information on the measurement surface of the workpiece is necessary. Such information may be obtained by measuring position of a plurality of points on the measurement surface of the workpiece in advance, or by utilizing design data, for instance, CAD data of the workpiece.

In the present invention, the stylus may preferably be linearly vibrated by the second vibrator.

Accordingly, suitable tapping operation can be conducted in the present invention.

BRIEF DESCRIPTION OF THE DRAWINGS

FIG. 5 is a graph showing a change in detection signal during scanning process of the first embodiment;

DETAILED DESCRIPTION OF PREFERRED EMBODIMENT(S)

Figure 1:
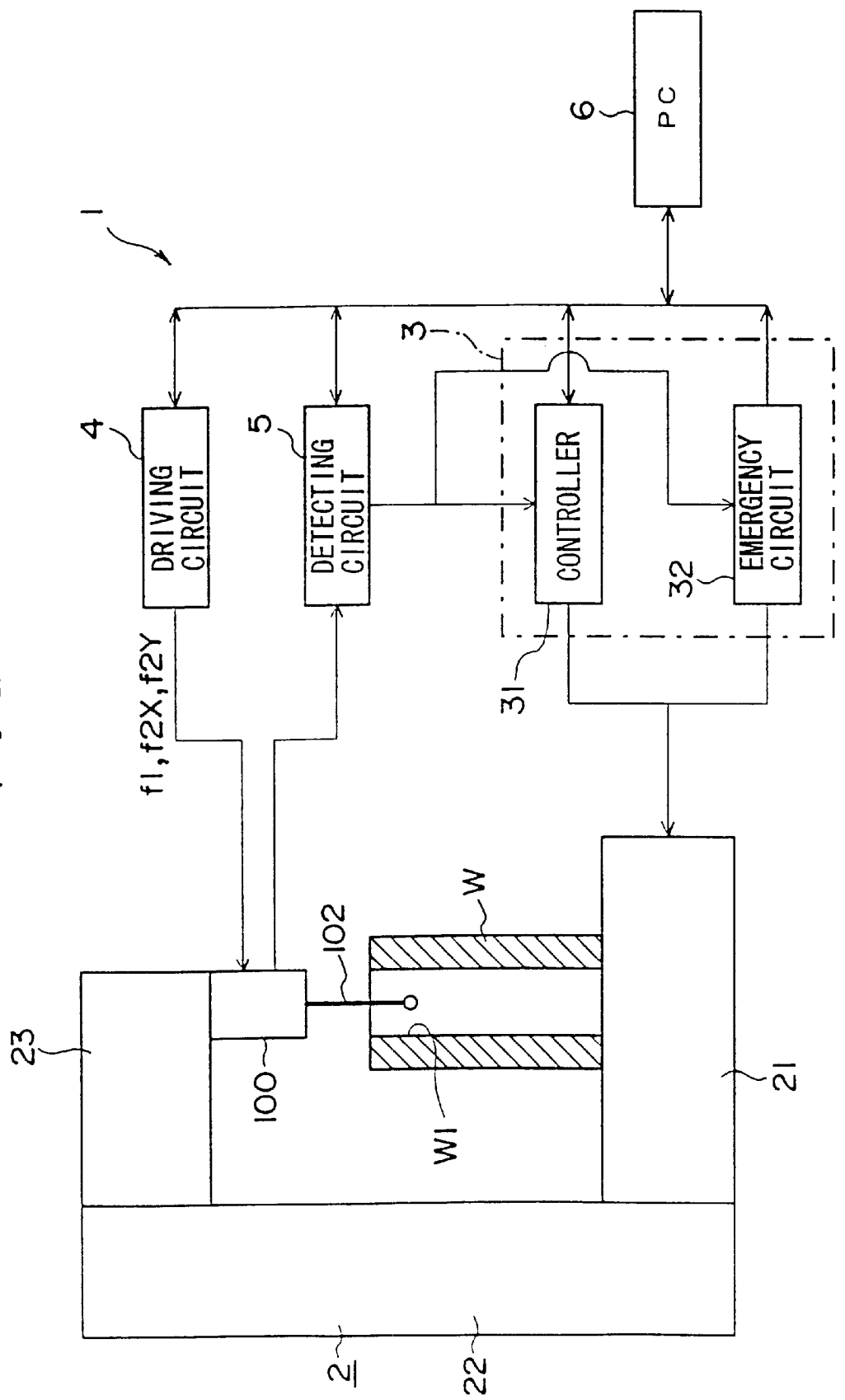
FIG. 1 is a schematic block diagram showing entire arrangement according to the first embodiment of the present invention.

A preferred embodiment of the present invention will be described below with reference to attached drawings. Incidentally, the same reference numeral will be attached to portions or members identical with or similar to the above-described components, thus omitting or simplifying the description therefor.

Figure 2:
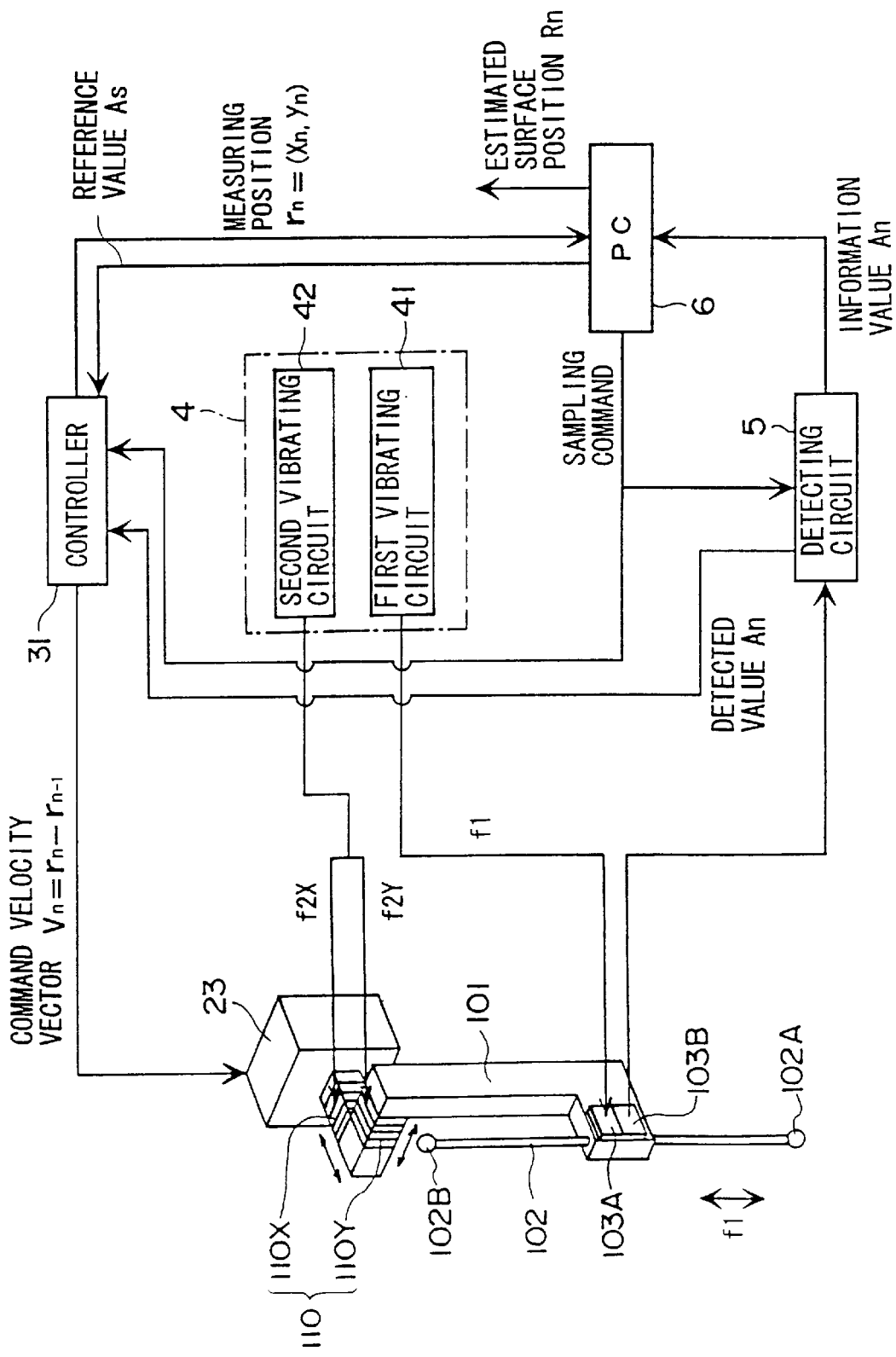
FIG. 2 is a block diagram showing primary portion of the first embodiment.

FIGS. 1 and 2 show an inside-outside measuring machine installed to practice the surface configuration measuring method according to the first embodiment of the present invention.

The inside-outside measuring machine 1 has a measuring machine body 2, a control circuit 3, a driving circuit 4, a detecting circuit 5, and a personal computer 6. The driving circuit 4 vibrates the touch signal probe 100 in the axial direction of the stylus and in a direction orthogonal with the axis. The detecting circuit 5 arithmetically processes the electric signal from the detector provided to the stylus and outputs a signal to the control circuit 3. The personal computer 6 outputs a control signal to the control circuit 3 to control the movement of the measuring machine body 2, and arithmetically processes the detected value of the detecting circuit 5 and the controller 31 of the control circuit 3 to evaluate the roundness, etc. of a workpiece W.

The workpiece W is put on the measuring machine body 2 to measure the surface configuration thereof. The measuring machine body 2 has an XYZ table 21 for the workpiece to be placed on, a column 22 disposed on an end portion of the XYZ table 21, a support body 23 slidable in a direction extending from the column 22, and the touch signal probe 100 supported by the support body 23.

Though not shown in FIG. 1, in order to place the workpiece W to a predetermined position, the XYZ table 21 has an X-axis adjusting mechanism and Y-axis adjusting mechanism for moving the workpiece W on the XYZ table 21, and a Z-axis adjusting mechanism for moving the workpiece W in a normal line direction to the surface of the XYZ table 21. After the workpiece W is put on the XYZ table 21, the axis adjusting mechanisms are operated to accurately adjust the position of the workpiece.

Further, though not shown in FIG. 1, the support body 23 has an X-axis driving mechanism and a Y-axis driving mechanism for moving the touch signal probe 100 along the surface of the XYZ table 21, and a Z-axis driving mechanism for elevating the support body 23 along the column 22. The movements of the axis driving mechanisms are controlled by the below-described control circuit 3.

The control circuit 3 controls the movement of the support body 23, which includes a controller 31 and an emergency circuit 32.

The controller 31 controls the movement of the support body 23 of the measuring machine body 2 based on a command from the personal computer 6. The controller 31 sends a command velocity vector $V_n$ to the axis driving mechanism of the support body 23 for commanding movement and the axis driving mechanism of the support body 23 which executes a movement based on the command velocity vector $V_n$. A reference value $A_s$ is sent from the personal computer 6 to the controller 31 when initiating operation, etc. The controller 31 monitors the detected amplitude value $A_n$ from the detecting circuit 5 during movement of the support body 23 and sets the command velocity vector $V_n$ so the detected amplitude value $A_n$ approximates the reference value $A_s$ to control the movement of the support body 23.

When the detection signal from the detecting circuit 5 cannot maintain a predetermined value, the emergency circuit 32 stops operation control by the controller 31 and outputs a control signal to move the support body 23 in a direction opposite to the moving direction of the touch signal probe 100 by the controller 31. The emergency circuit 32 makes the touch signal probe 100 non-contact with the workpiece W, thus preventing damage caused by excessive contact force.

As shown in FIG. 2, the touch signal probe 100 has the stylus holder 101, the stylus 102, the contact portion 102A, the counter balance 102B, the vibrator 103A, and the detector 103B. Second vibrator 110 for vibrating the stylus 102 in a direction orthogonal with the axis of the stylus 102 is provided between the support body 23 and the stylus holder 101 supported by the support body 23. Incidentally, the second vibrator 110 has an X-axis vibration element 110X and a Y-axis vibration element 110Y vibrating in mutually orthogonal directions for vibrating the stylus 102 on a plane orthogonal with the axis of the stylus 102 in a desired direction. The X-axis vibration element 110X and the Y-axis vibration element 110Y are serially disposed between the stylus holder 101 and the support body 23.

The driving circuit 4 applies electric signals of a predetermined frequency to the vibrator 103A and the second vibrator 110, which is composed of a first vibration circuit 41 and second vibration circuit 42.

The first vibration circuit 41 has an oscillator for generating an electric signal to operate the vibrator 103A at a predetermined amplitude and frequency, thus vibrating the stylus 102 in the axial direction at a frequency f1.

The second vibration circuit 42 has an oscillator for generating an electric signal to operate the above-described X-axis vibration element 110X and the Y-axis vibration element 110Y at a predetermined amplitude and frequency.

Incidentally, though the oscillator synchronously actuates the X-axis vibration element 110X and the Y-axis vibration element 110Y, the amplitude of the electric signal of respective vibration elements 110X and 110Y can be independently adjusted. By applying electric signals having different amplitude to the respective vibration elements 110X and 110Y, the stylus 102 vibrates in any desired direction. Accordingly, the vibration of the vibration elements 110X and 110Y synchronizes, so that the stylus 102 vibrates in any direction on a plane orthogonal with the axis of the stylus 102 at frequency f2.

Detection signal (detected amplitude value $A_n$) from the detecting circuit 5 is inputted to the personal computer 6. A predetermined cycle of the sampling signal is outputted from the personal computer 6 to the detecting circuit 5 and the detecting circuit 5 outputs the detected amplitude value $A_n$ at the time when the sampling signal is sent.

A current position (measuring position $r_n$) is inputted from the controller 31 to the personal computer 6. The same sampling signal as sent to the detecting circuit 5 is sent to the controller 31 and the controller 31 outputs the measuring position $r_n$ corresponding to the detected amplitude value $A_n$ outputted by the above-described detecting circuit 5 to the personal computer 6.

Further, the personal computer software includes a calculation function where a plurality of data sets comprising the detected amplitude value $A_n$ and the measuring position $r_n$ are arithmetically processed to obtain an estimated surface position $R_n$.

Figure 3:
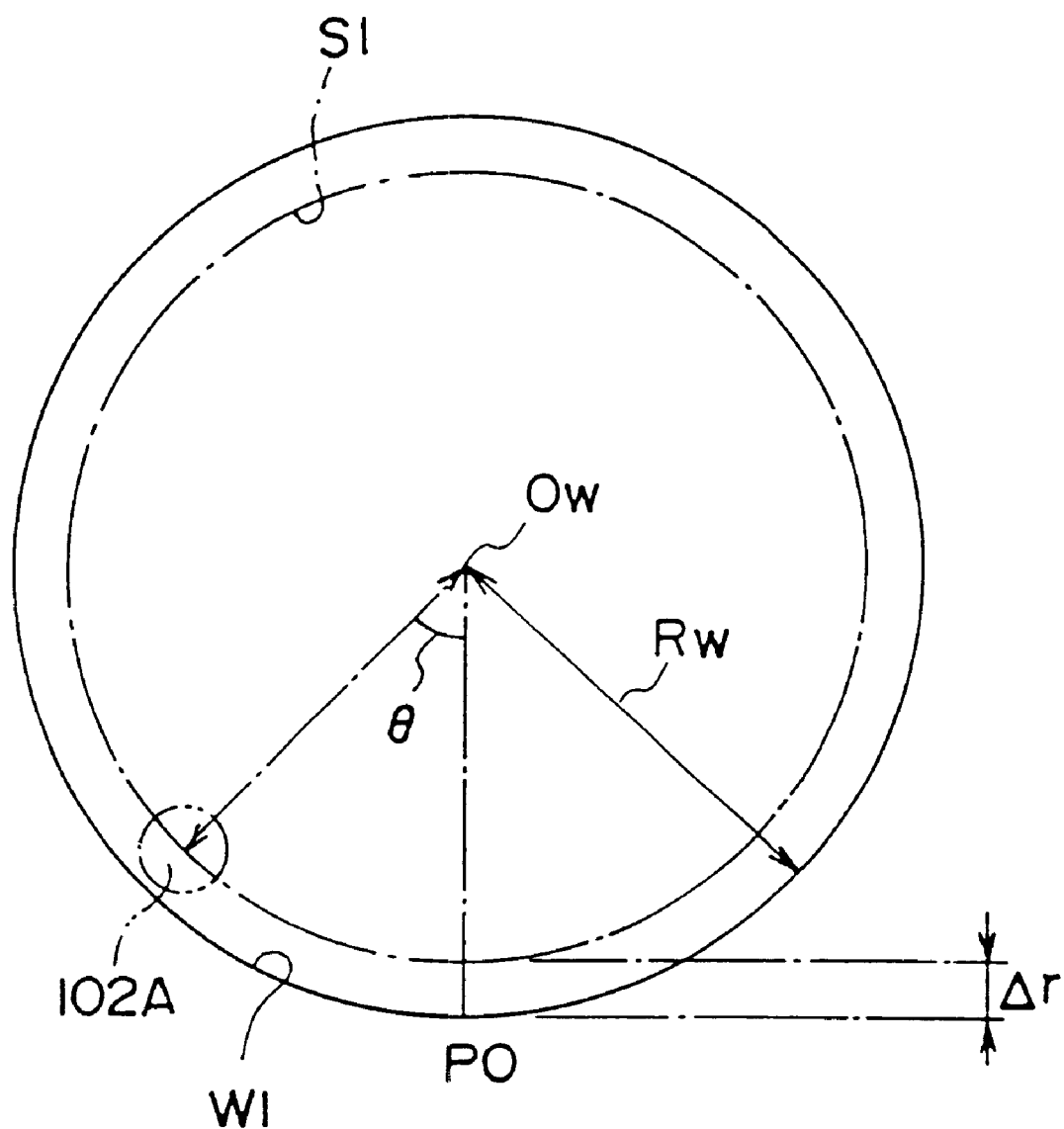
FIG. 3 is a schematic plan view showing an outline of measurement of the first embodiment.

Next, the operation of the inside-outside measuring machine 1 of the above-described first embodiment will be described below with reference to measuring configuration of inner circumference W1 as shown in FIG. 3.

(1) As shown in FIG. 3, a position coordinate of the inner diameter center $O_w$ and approximate radius $R_w$ are measured in advance by three-point measurement or utilization of CAD data, etc.

(2) Considering amplitude of the stylus 102 by the second vibrator 110, circle S1, being smaller than the radius $R_w$ by $\Delta r$, is set in the controlling circuit 31 as a fundamental movement locus of the contact portion 102A. More specifically, the movement of the contact portion 102A is controlled based on an angle θ from a measurement initiation point P0 in FIG. 3 and radius $R_w - \Delta r$. Incidentally, since the amplitude of the vibration orthogonal with the axis of the stylus 102 by the second vibrator 110 is extremely small, the $\Delta r$ may practically be regarded as a value approximately the same as the radius of the contact portion 102A.

(3) The electric signal of the second vibration circuit 42 is set as a function of the angle θ so that the stylus 102 vibrates along normal line of the inner surface W1 by the second vibrator 110, and the X-axis vibration element 110X and the Y-axis vibration element 110Y constituting the second vibrator 110 are actuated. More specifically, when the X-axis vibration element 110X is vibrated in a direction connecting the center $O_w$ of the circle S1 and the measurement initiation point Po, when maximum force of the X-axis vibration element 110X and the Y-axis vibration element 110Y in a direction orthogonal with the axis of the stylus 102 is defined as F, and when the frequency by the second vibration circuit 42 is defined as f2, the force Fx in X-axis direction by the X-axis vibration element 110X and the force Fy in Y-axis direction by the Y-axis vibration element 110Y can be set as the following functions.

$$Fx = F^* \sin(2\pi^* f 2^* t)^* \cos \theta$$

$$Fy = F^* \sin(2\pi^* f 2^* t)^* \sin \theta \text{ (t represents time)}$$

Accordingly, the contact portion 102A taps the inner surface W1 at a predetermined frequency (1/f2).

(4) Vibrating the stylus 102 in the axial direction by the vibrator 103B and tapping the inner surface W1 by the contact portion 102A, while scanning of the inner surface W1 is initiated by the controller 31.

(5) During the scanning process, the controller 31 appropriately controls the command velocity vector $V_n$ based on the detected amplitude value $A_n$ from the detecting circuit 5 and operates the support body 23 to move the touch signal probe 100 along the inner surface W1. In accordance with the movement, the detected amplitude value $A_n$ by the detecting circuit 5 and the measuring position $r_n$ detected by the controller 31 are accumulated in the personal computer 6 as a detected amplitude value group $A_0 \sim A_m$ and measuring position group $r_0 \sim r_m$ for respective measuring points n=0~m.

(6) When the scanning process is completed, the personal computer 6 arithmetically processes the accumulated detected amplitude value group $A_0 \sim A_m$ and the measuring position group $r_0 \sim r_m$ to calculate estimated surface position group $R_0 \sim R_m$ for respective scanned points of the inner surface W1.

Next, details of the scanning process and calculation process will be described below.

First, the movement of the touch signal probe 100 (profiling movement) during the scanning the process will be described.

Figure 4:
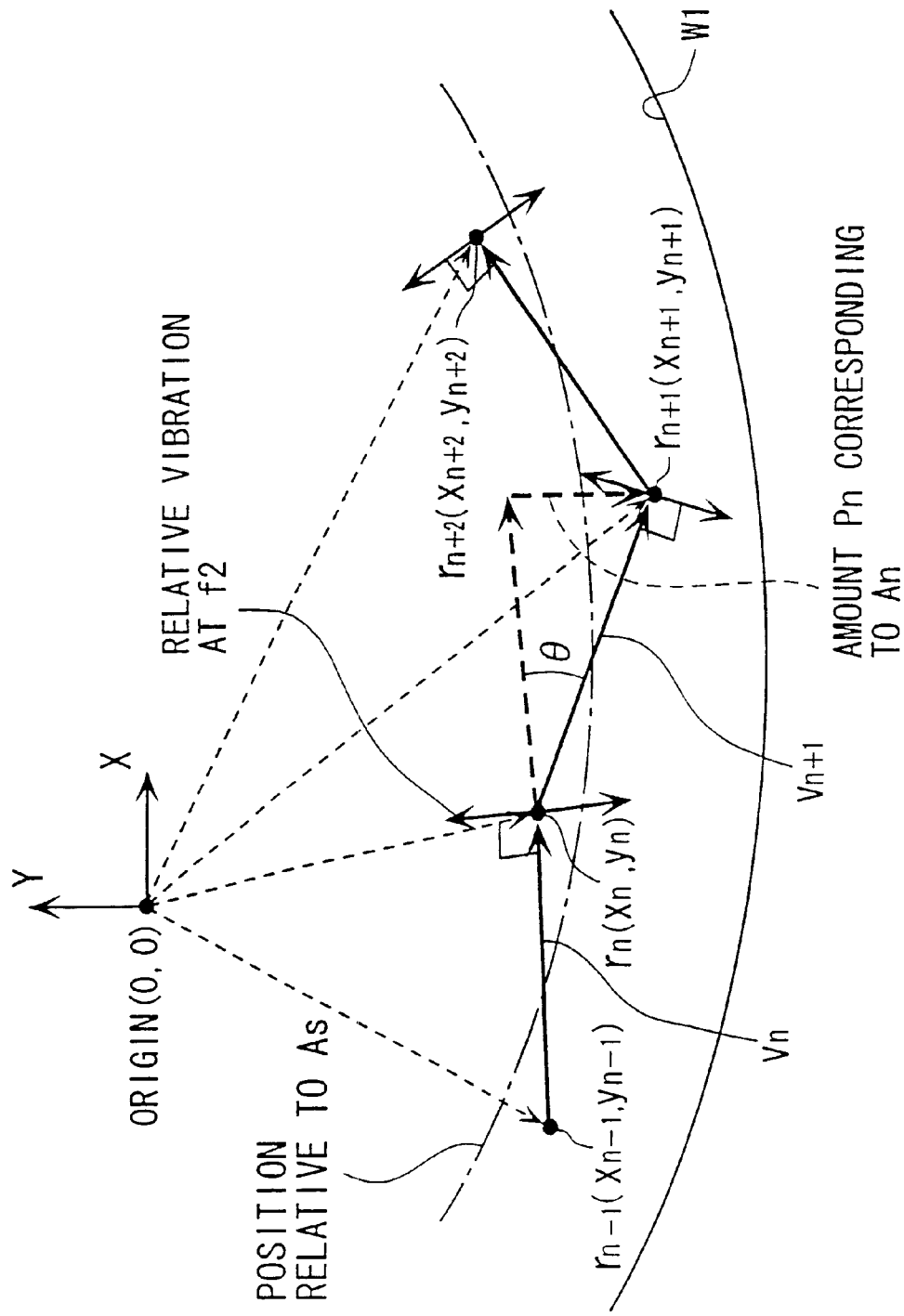
FIG. 4 is a schematic plan view showing scanning process of the first embodiment.

In FIG. 4, the position of the touch signal probe 100 sequentially moves from $r_{n-1}$ to $r_n$, $r_{n+1}$, and $r_{n+2}$. Respective positions $r_{n-1}$, $r_n$, $r_{n+1}$, and $r_{n+2}$ are represented as position vectors $r_n = (x_n, y_n)$ from the origin (0,0) of the coordinate system. Arrows extending from respective points in mutually opposite directions indicate vibration of tapping movement. In the above arrangement, the movement direction vector when a point $r_n$ moves to the next point $r_{n+1}$, based on which the controller 31 successively sets the command velocity vector, is decided as follows.

Detected amplitude of the vibration obtained by the detection signal from the detecting circuit 5 at nth measurement point is defined as $A_n$, and the detected position of the touch signal probe 100 at this time is defined as measuring position $r_n = (x_n, y_n)$. Similarly, detected amplitude of the vibration obtained by the detection signal from the detecting circuit 5 at n+1th measurement point is defined as $A_{n+1}$ and the detected position of the touch signal probe at this time is defined as measuring position $r_{n+1} = (x_{n+1}, y_{n+1})$.

Accordingly, the movement direction vector from the point $r_n$ to the point $r_{n+1}$ is $v_{n+1} = (x_{n+1} - x_n, y_{n+1} - y_n) = (v_{xn+1}, v_{yn+1})$. At preceding measuring point, the movement direction vector is $v_n = (x_n - x_{n-1}, y_n - y_{n-1}) = (v_{xn}, v_{yn})$. Therefore, when magnitude of the movement direction vector is made even, the following equation is established.

$$R^2 = V_{xn}^2 + V_{yn}^2 = V_{xn+1}^2 + V_{yn+1}^2 \quad (1)$$

Using a unit vector $e_z$ in Z axis direction (axis direction of the stylus 102), the vector product for each movement direction vector $V_n$ and $V_{n+1}$ can be represented as follows:

$$V_n \times V_{n+1} = (\sqrt{V_{xn}^2 + V_{yn}^2} \sqrt{V_{xn+1}^2 + V_{yn+1}^2} \sin \theta) e_z \quad (2)$$

$$V_n \times v_{n+1} = (v_{xn}, v_{yn}) \times (v_{n+1}, v_{yn+1}) = (v_{xn} V_{yn+1} - V_{xn+1} V_{yn}) e_z \quad (3)$$

In the above, since change in direction θ is reduced when the interval of the sampling time is shortened, relationship of sin θ≈θ can be established, thus the following equation can be established by modifying the equation (2) and the equation (3).

$$\sqrt{V_{xn}^2 + V_{yn}^2} \sqrt{V_{xn+1}^2 + V_{yn+1}^2} \theta = V_{xn} V_{yn+1} - V_{xn+1} V_{yn} \equiv P_n \quad (4)$$

The touch signal probe 100 must be moved so that the touch signal probe keeps the predetermined contact status irrespective of position thereof during scanning of the inner surface W1, in other words, so that the detected amplitude value $A_n$ keeps the reference value $A_s$ by contact.

Specifically, as shown in FIG. 5, when respective detected amplitude values $A_{n-1} \sim A_{n+2}$ and the reference value $A_s$ shows difference $(A_{n-1} - A_s \sim A_{n+2} - A_s)$ on respective points $r_{n-1} \sim r_{n+2}$, the touch signal probe has to be controlled to eliminate the difference.

Since $P_n$ of equation (4) depends on $A_n$, $P_n$ can be represented using proportionality factor k around the range of θ=0, as follows:

$$P_n = k(A_n - A_s) \quad (5)$$

Accordingly, the components of the movement direction vector $V_{xn+1}$ and $V_{yn+1}$ can be obtained as follows:

$$R^2 = v_{xn+1}^2 + \left( \frac{v_{xn+1} v_{yn} + P_n}{v_{xn}} \right)^2 \quad (6)$$

$$v_{xn+1}^2 + 2 P_n \frac{v_{yn}}{R^2} v_{xn+1} + \left( v_{xn}^2 - \frac{P_n^2}{R^2} \right) = 0$$

$$v_{xn+1} = -\frac{P_n}{R^2} v_{yn} \pm v_{xn} \sqrt{1 - \left( \frac{P_n}{R^2} \right)^2}$$

$$R^2 = v_{yn+1}^2 + \left( \frac{v_{yn+1} v_{xn} + P_n}{v_{yn}} \right)^2 \quad (7)$$

$$v_{yn+1}^2 + 2 P_n \frac{v_{xn}}{R^2} v_{yn+1} + \left( v_{yn}^2 - \frac{P_n^2}{R^2} \right) = 0$$

$$v_{yn+1} = -\frac{P_n}{R^2} v_{xn} \pm v_{yn} \sqrt{1 - \left( \frac{P_n}{R^2} \right)^2}$$

Further, after arranging these equations (6) and (7), the following equation can be established:

$$v_{xn+1} = -Q_n v_{yn} \pm v_{xn} \sqrt{1 - Q_n^2} \quad (8)$$

$$v_{yn+1} = -Q_n v_{xn} \pm v_{yn} \sqrt{1 - Q_n^2}$$

$$\left( Q_n \equiv \frac{P_n}{R^2} = \frac{k(A_n - A_s)}{R^2} \right)$$

Accordingly, the movement from nth point (position vector $V_n$) to n+1th point (position vector $V_{n+1}$) can be determined using detected amplitude value $A_n$.

Since the above process is ordinarily conducted by digital calculation, discrete error can be generated to affect the value R, which can be resolved by correcting the value R to a predetermined value as required.

The profiling movement of the touch signal probe 100 is controlled as mentioned above. At this time, the support body 23 is moved according to command velocity vector from the controller 31 based on the movement direction vector $V_{n+1}$.

Further, since the movement direction vector $V_{n+1}$ runs along the inner surface W1, the inner surface W1 can be always tapped in a normal line direction by correcting vibration direction of tapping movement to a direction orthogonal with the movement velocity vector $V_{n+1}$.

Accordingly, the profile of the workpiece can be scanned even when the configuration of the workpiece is not known, where the measurement surface can be securely tapped in the normal line direction.

Next, calculation of the estimated surface position $R_n(R_0 \sim R_m)$ of the inner surface W1 from the detected amplitude value $A_n$ sampled at respective measurement points and measuring positions $r_n$ (accumulated detected amplitude value group $A_0 \sim A_m$ and the measuring position group $r_0 \sim r_m$) during the above-described scanning process will be described.

In FIG. 6, output signal of the touch signal probe 100 has the following characteristics.

Figure 6A:
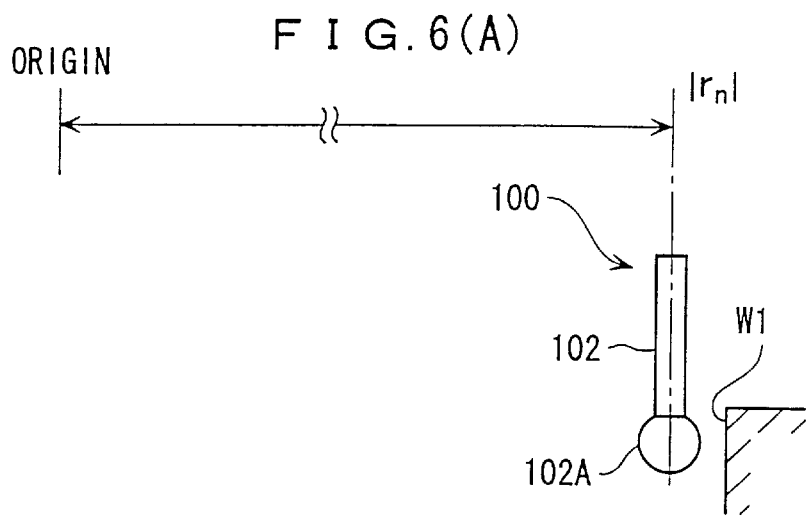
FIGS. 6(A) to (C) are schematic elevations showing contact status of the tip end of the stylus of the first embodiment.

Referring to FIG. 6(A), when the stylus 102 of the touch signal probe 100 does not touch the inner surface W1, the measuring position $r_n$ of the touch signal probe 100 indicates the axis of the stylus 102 which coincides with the center of the contact portion 102 at the tip end of the stylus 102.

Figure 6B:
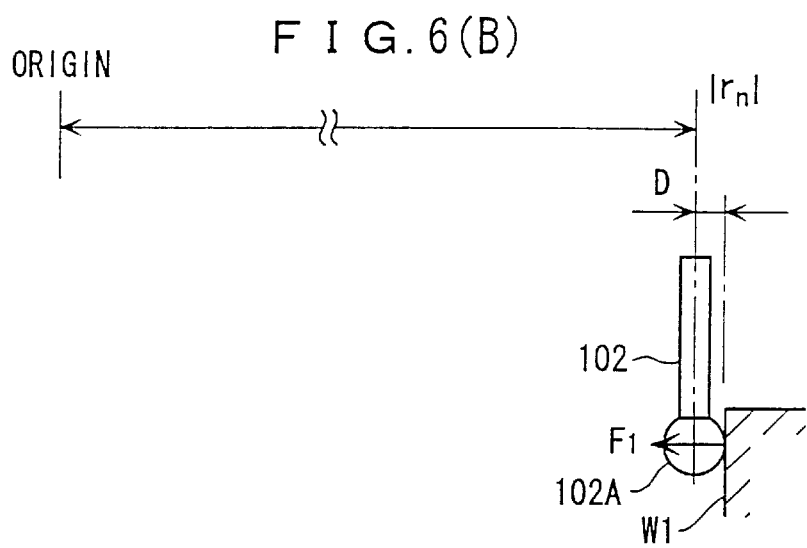

Referring to FIG. 6(B), when the contact portion 102A touches the inner surface W1, a contact force $F_1$ as a reaction force from the inner surface W1 is slightly caused. At this state, the position of the inner surface W1 can be calculated by a sum of the measuring position $r_n$ and spherical radius D (offset amount from the axis of the stylus) of the contact portion 102A.

Figure 6C:
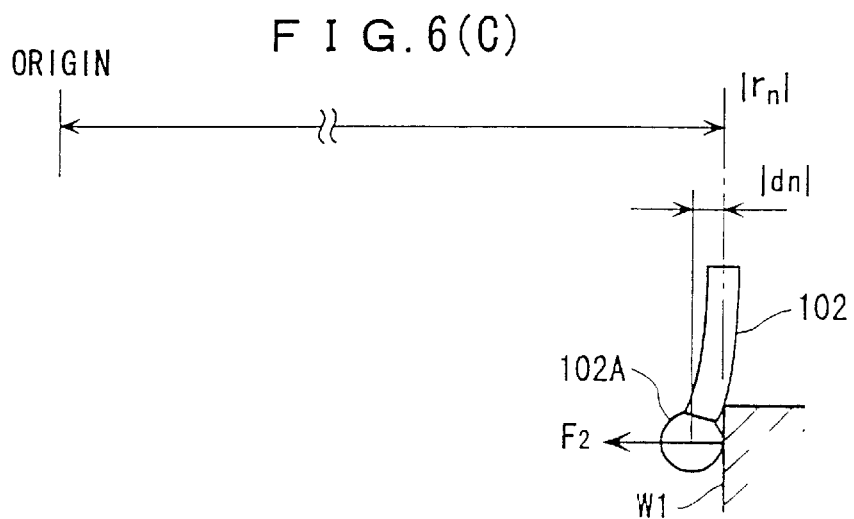

Referring to FIG. 6(C), when the stylus 102 is further pressed to the inner surface W1, the contact force $F_1$ is increased to bend the stylus 102. At this state, the center of the axis of the stylus 102 and the contact portion 102A are shifted and the center of the contact portion 102A is different from the measuring position $r_n$ read out by the controller 31. The shift amount is an overtravel amount $d_n$, and accurate measurement is impossible unless the amount is eliminated or made constant.

Figure 7:
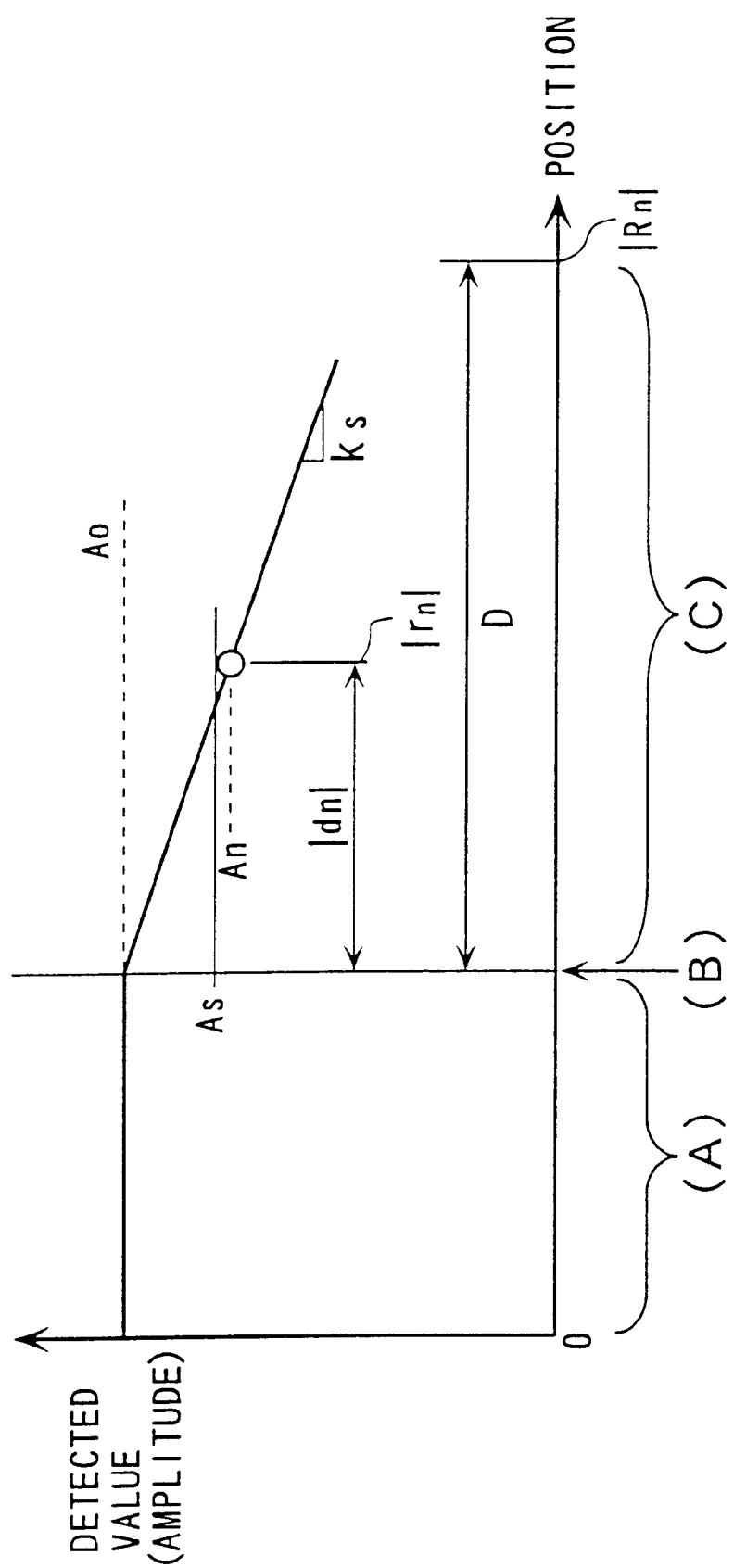
FIG. 7 is a schematic view showing change in detection signal in accordance with contact status of the tip end of the stylus of the first embodiment.

In FIG. 7, during the state of the above FIG. 6(A), the contact portion 102A does not touch the inner surface W1 and the stylus 102 is resonated at frequency f1 irrespective of position thereof and the detected amplitude value $A_n$ of the stylus 102 obtained by the detecting circuit 5 is constant at its maximum value $A_0$.

When the contact portion 102A touches the inner surface W1 as shown in FIG. 6(B), the stylus 102 ceased to be resonated and the detected amplitude value $A_n$ decreases with its vibration being restrained. Decrease in the amplitude is imminent in accordance with the contact force against the inner surface W1, in other words, in accordance with overtravel amount. The proportional relationship at this time can be represented by sensitivity gradient $k_s$.

According to the above relationship, accuracy can be maintained by making the overtravel amount $d_n$ constant by controlling the movement of the stylus 102 so that the detected amplitude value $A_n$ keeps the predetermined reference value $A_s$.

However, since the movement of the stylus 102 is controlled by prediction control, the detected amplitude value $A_n$ does not, strictly speaking, fall on the reference value $A_s$. Therefore, as shown in FIG. 5, the detected amplitude value $A_n$ is slightly shifted relative to the reference value $A_s$.

Accordingly, the overtravel amount $d_n$ can be calculated according to the relationship of the above-described measuring position $r_n$, the detected amplitude value $A_n$ and the reference value $A_s$, and the estimated surface position $R_n$ of the inner surface W1 can be calculated by adding the spherical radius D of the contact portion 102A.

The relationship between the scalar $|d_n|$ of the overtravel amount and the detected amplitude value $A_n$ can be established with reference to the sensitivity gradient $k_s$ and the maximum amplitude value $A_0$ as follows:

$$A_n = k_s |d_n| + A_0 \qquad (9)$$

Accordingly, scalar of the overtravel amount $|d_n|$ is represented as follows:

$$|d_n| = \frac{A_n - A_0}{k_s} \qquad (10)$$

Further, scalar $|R_n|$ of the estimated surface position is estimated considering the spherical radius D of the contact portion 102A, as follows:

$$|R_n| = |r_n| + |d_n| + D = |r_n| + \frac{A_n - A_0}{k_s} + D \qquad (11)$$

All the contact positions on the measuring surface can be estimated by conducting the above calculation for every measurement point.

Incidentally, though the touch signal probe 100 is supposed to have constant sensitivity gradient $k_s$ in accordance with displacement, the sensitivity gradient actually may not be constant. Therefore, further improvement in accuracy is possible by employing characteristic representation or characteristic table that conforms to the actual condition.

Subsequent to the above-described process for estimating scalar $|R_n|$ of the estimated surface position, estimation of the actual estimated surface position $R_n$ considering direction will be described below.

Detected amplitude value group $A_0 \sim A_m$ and corresponding measuring position group $r_0(x_0, y_0) \sim r_m(x_m, y_m)$ are accumulated in the personal computer 6 after completion of the scanning process shown in FIG. 4. Estimated surface positions $R_0 \sim R_m$ of the inner surface W1 can be obtained by the accumulated data as follows.

Initially, for obtaining the estimated surface position $R_n$, preceding and succeeding measuring positions $r_n-1$ and $r_n+1$ relative to the measuring position $r_n$ are used to determine: a position vector $R'_n$ when the contact force is 0; and a direction for converting the position vector $R'_n$ to a regular position vector $R_n$.

Figure 8:
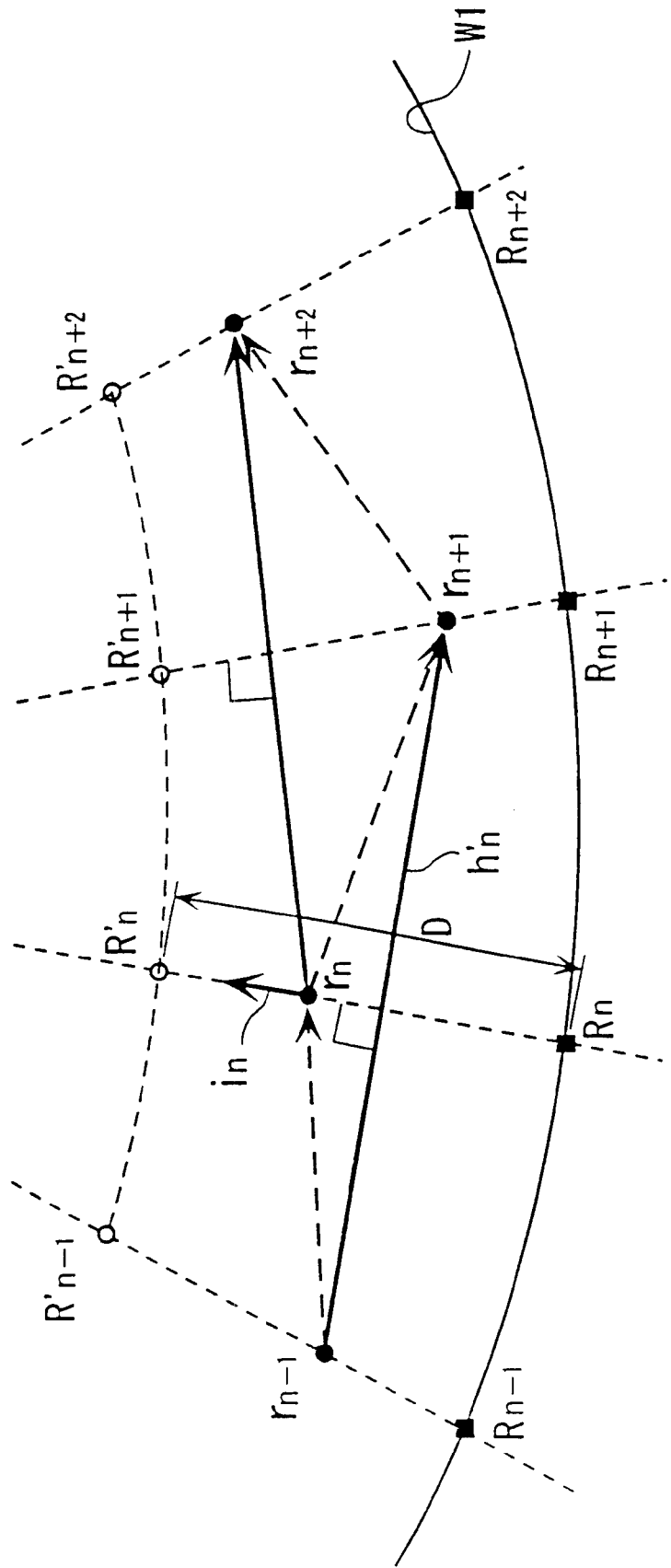
FIG. 8 is a schematic plan view showing calculation process of the first embodiment.

As shown in FIG. 8, if an auxiliary vector $h'_n$ is supposed as $h'_n = r_n + 1 - r_n - 1$, another vector $h_n = \pm(y_{n+1} - y_{n-1}, -(x_{n+1} - x_{n-1}))$ perpendicular to $h'_n$ can be set. Incidentally, since the auxiliary vector $h'_n$ is approximately parallel to the tangent of corresponding position on the measurement surface, the perpendicular vector $h_n$ is approximately orthogonal with the corresponding position on the measurement surface. Among the directions, one direction can be selected by considering the direction for correcting the position vector $R'_n$ in the same manner as deciding control corresponding to the detected amplitude during profiling measurement. Selection is not restricted to the above. For instance, since on which side of advancement direction the measurement surface lies is ordinarily known in advance, either one of the sides may be selected based thereon.

The unit vector $i_n$ in a direction to be corrected is calculated by the selected vector.

$$i_n = \frac{h_n}{|h_n|} \qquad (12)$$

R'$_n$ can be calculated from r$_n$ by assigning the direction of the above equation (12) into the above-described equation (11).

$$R'_n = r_n - d_n i_n \qquad (13)$$

Further, considering the spherical radius D of the contact portion 102A as an offset amount, the estimated surface position Rn is estimated as follows:

$$R_n = R'_n + Di_n = r_n - (d_n - D)i_n = r_n - \left(\frac{A_n - A_0}{k_s} - D\right)i_n \qquad (14)$$

The estimated configuration of the measurement surface (inner surface W1) can be obtained by thus measured set of R$_n$(R$_0$~R$_m$). Incidentally, since the value of the preceding and succeeding measurement points are used, measured surface position (R$_0$, R$_m$) for edge points (0$_{th}$ and m$_{ath}$) cannot be obtained. However, in this case, the effective range may be widened by enlarging the end positions etc.

According to the above-described first embodiment, the detected amplitude value A$_n$ and the measuring position r$_n$ of respective points are collected by scanning the surface, based on which the estimated surface position R$_n$ can be calculated.

At this time, though the distance between the stylus and the surface is controlled so that detected amplitude value A$_n$ reaches the reference value A$_s$, the stylus does not settle on respective points until the detected amplitude value A$_n$ converges to the reference value A$_s$, thus not requiring conventional convergence time.

On the other hand, the estimated surface position R$_n$ can be deduced by correcting the measuring position r$_n$ with the detected amplitude value A$_n$, so that an accurate value can be obtained if the stylus does not reach a position where the detected amplitude value A$_n$ equals the reference value A$_s$.

During the scanning process, since the command velocity vector V$_{n+1}$ is determined by equaling the scalar of the vector product of the preceding value V$_n$ and the present value V$_{n-1}$ and the difference between the detected amplitude value A$_n$ and the reference value A$_s$ multiplied by proportionality factor k, the stylus can be easily and appropriately controlled to move so that the detected amplitude value A$_n$ approximates the reference value A$_s$.

During calculation, since the estimated surface position R$_n$ is defined by, after determining the succeeding measuring position r$_{n+1}$ relative to measuring position r$_n$, setting a position starting from the measuring position r$_n$ having a magnitude corresponding to the detected amplitude value A$_n$ and being corrected orthogonal with a straight line connecting the succeeding measuring position r$_{n+1}$ and the preceding measuring position r$_{n-1}$, the estimated surface position R$_n$ can be obtained by an easy calculation and with high accuracy.

During calculation, since the estimated surface position R$_n$ is determined by adding the offset amount D of the contact portion 102A of the stylus 102 relative to the stylus axis with a position corresponding to the detected amplitude value A$_n$, the estimated surface position R$_n$ can be accurately measured.

When the scanning process of the surface to be measured is initially completed, all the necessary detected amplitude values A$_n$ and corresponding measuring positions r$_n$ are sequentially stored. Subsequently, the estimated surface position group R$_0$~R$_m$ is obtained by the stored detected value group A$_0$~A$_m$ and corresponding measuring value group r$_0$~r$_m$ by the above calculation. Therefore, the scanning process for detecting the detected value group A$_0$~A$_m$ and the measuring position group r$_0$~r$_m$ can be independently and sequentially conducted, so that the control thereof can be simplified as compared by conducting both processes in parallel. Further, since there is no need for considering operation timing of both processes, respective processes can be adjusted to be the fastest.

Further, in the present embodiment, since the stylus 102 is resonated at the frequency f2 orthogonally with the stylus axis for enabling the tapping method, and, during the scanning process, since the detected amplitude value A$_n$ of the detection signal outputted by the detecting circuit 5 is latched when the tapping vibration f2 is at a predetermined phase and the latched detected amplitude value A$_n$ is compared with the reference value A$_s$ to control the stylus 102, accurate control can be conducted.

At this time, since the direction of the tapping vibration f2 of the stylus 102 is approximately orthogonal with the axis of the stylus 102 and the movement direction of the support body 23 (direction toward the measurement surface, profiling direction) during the scanning process, the vibration being linear, appropriate tapping operation can be conducted.

Next, a second embodiment of the present invention will be described.

The second embodiment is the same as the above-described first embodiment in the arrangement of the device and scanning steps and differs in the calculation process of the estimated surface position R$_n$ as the final step of the operation steps. Accordingly, only the different calculation step of the estimated surface position R$_n$ will be described below, thus omitting the description of the other common parts.

Figure 9:
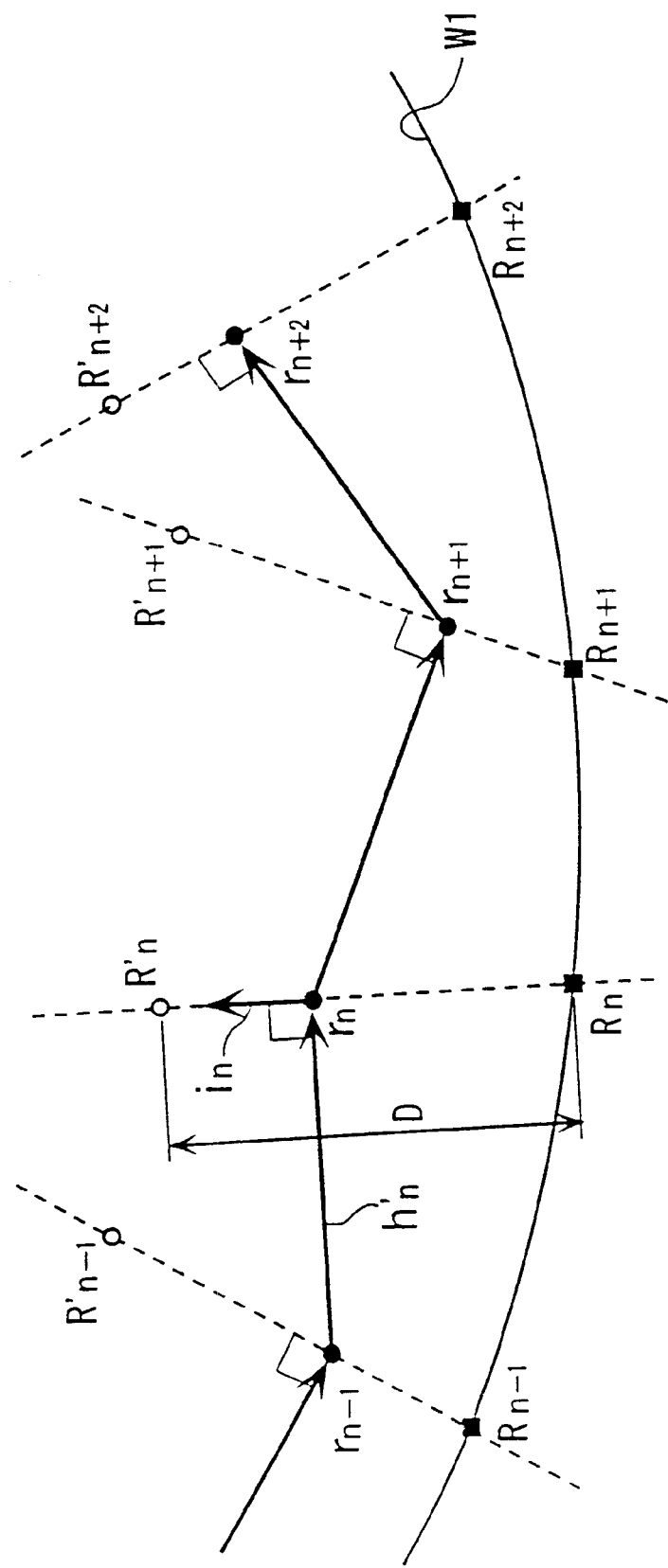
FIG. 9 is a schematic plan view showing calculation process of the second embodiment of the present invention.

FIG. 9 shows calculation steps of the estimated surface position R$_n$ according to the present embodiment. Though auxiliary vector h'$_n$ is set as h'$_n$=r$_{n+1}$-r$_{n-1}$ in the above first embodiment, the auxiliary vector h'$_n$ is set as h'$_n$=r$_n$-r$_{n-1}$ in the present embodiment. Subsequent calculation may be the same as the first embodiment.

According to the second embodiment, since the succeeding measuring position r$_{n+1}$ as in the first embodiment is not required, the detection data can be immediately processed arithmetically.

Specifically, when the detection data (detected amplitude value A$_n$ and the measuring position r$_n$) of all the measurement points are stored in advance and the estimated surface position R$_n$ is collectively calculated thereafter as in the first embodiment, succeeding measuring position r$_{n+1}$ can be easily obtained. However, if the detection data is not stored and the estimated surface position R$_n$ is calculated for each measurement at the respective measurement point, succeeding measuring position r$_{n+1}$ cannot be obtained until moving to the next measuring point.

However, by employing operation method of the present embodiment, the operating process can be securely conducted even when the detection data is not stored.

Next, the third embodiment of the present invention will be described.

The third embodiment is the same as the above-described first embodiment in the arrangement of the device and scanning steps and differs in the calculation process of the estimated surface position R$_n$ as the final step of the operation process. Accordingly, only the different calculation step of the estimated surface position R$_n$ will be described below, thus omitting description of the other common parts.

Figure 10:
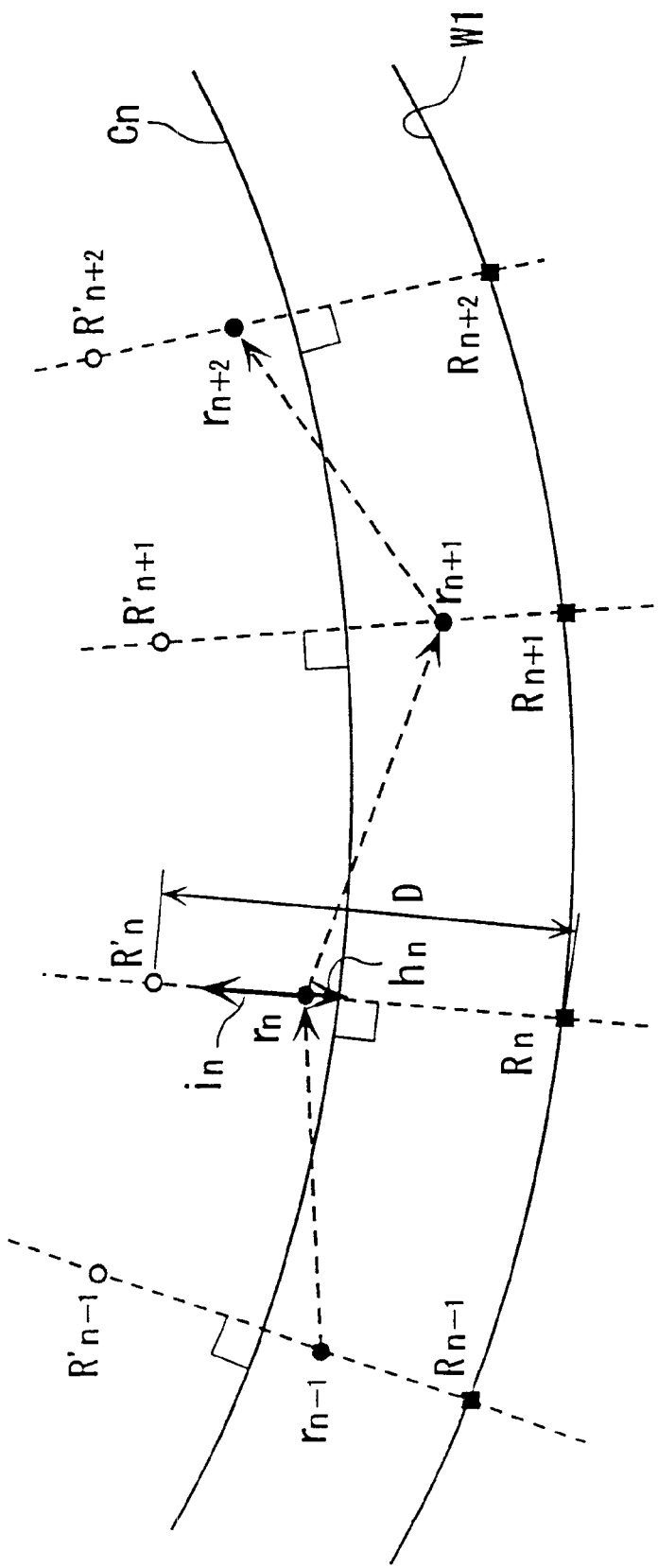
FIG. 10 is a schematic plan view showing calculation process of the third embodiment of the present invention.

FIG. 10 shows calculation steps of the estimated surface position R$_n$ according to the present embodiment. Auxiliary vector $h'_n$ is set as $h'_n = r_{n+1} - r_{n-1}$ in the above first embodiment, and the auxiliary vector $h'_n$ is set as $h'_n = r_n - r_{n-1}$ in the above second embodiment. In contrast thereto, in the present embodiment, a plurality of measurement points adjacent to $r_n$ ($r_{n-1}$, $r_n$, $r_{n+1}$, $r_{n+2}$ etc.) is selected. An approximate curve $C_n$ is set based on the respective points and a perpendicular is drawn from the measuring point $r_n$ to the nearest point on the approximate curve. The perpendicular is set as a perpendicular vector $h_n$. Subsequent calculation may be conducted in the same manner as the first embodiment.

According to the above third embodiment, since the perpendicular vector $h_n$ can be derived by a larger number of measuring points ($r_{n-1}$, $r_n$, $r_{n+1}$, $r_{n+2}$) than the first embodiment, measurement accuracy can be further enhanced.

Especially, when detection data is stored by scanning in advance and subsequently the arithmetic operation process is conducted, the data for a plurality of measuring points can be easily used, so that accuracy can be easily improved.

Next, the fourth embodiment of the present invention will be described.

Figure 11:
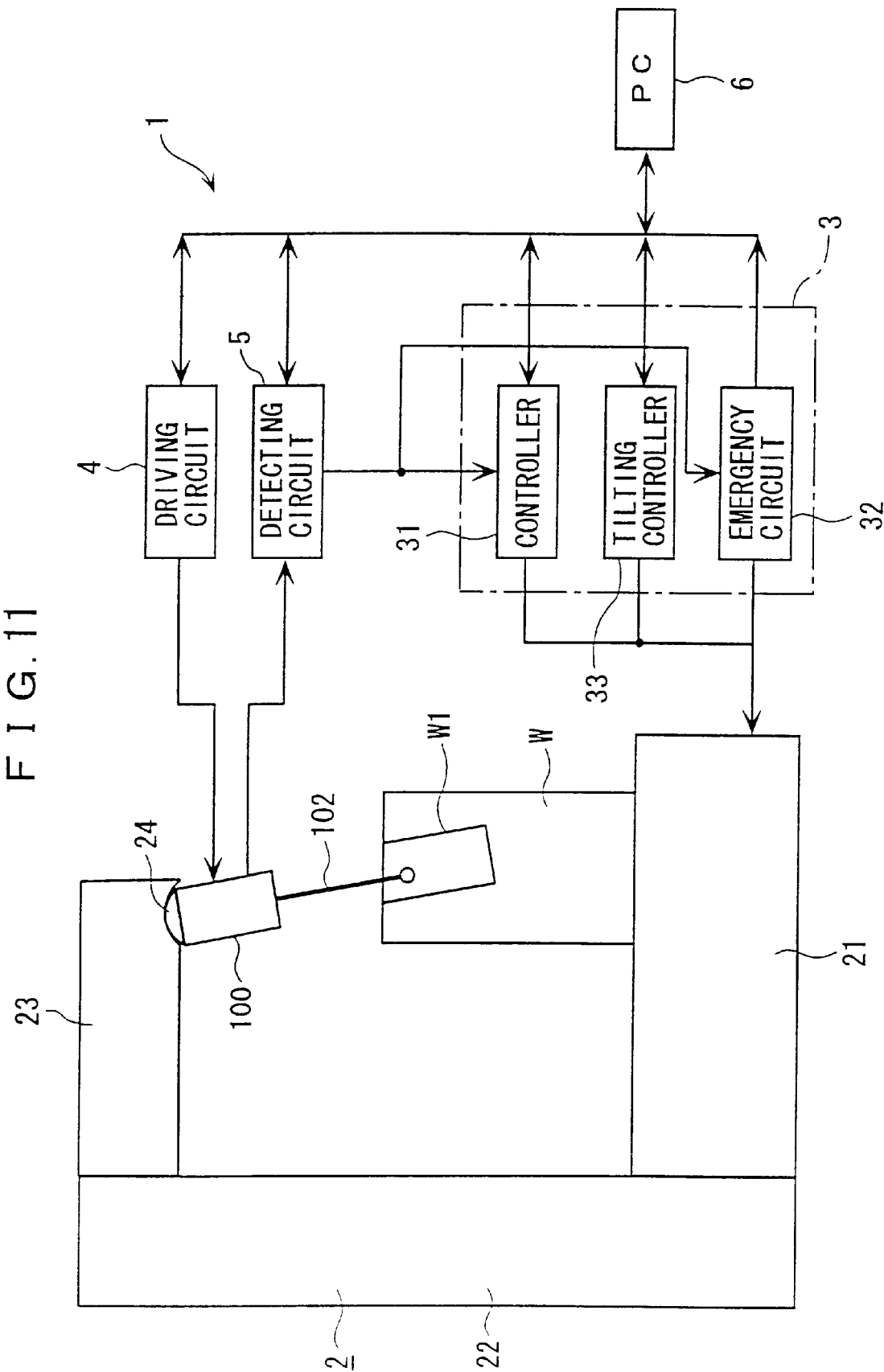
FIG. 11 is a block diagram showing primary portion of the fourth embodiment of the present invention.
Figure 12:
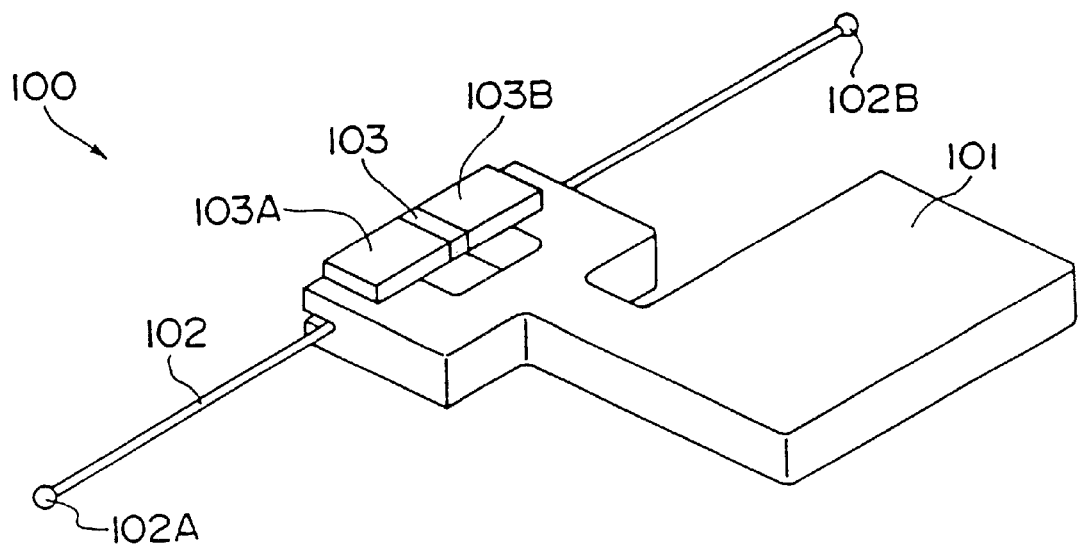
FIG. 12 is a perspective view showing stylus portion of the conventional touch signal probe.

As shown in FIG. 11, the arrangement of the device is substantially the same as the first embodiment except that the support body 23 has a tilting driver 24 for rotating and tilting the touch signal probe 100 in a desired attitude and the control circuit 3 has a tilting controller 33, thus adjusting the attitude of the touch signal probe 100 in accordance with inclination of the inner surface W1 of the workpiece W.

During actual measurement, the attitude of the touch signal probe 100 has to be adjusted prior to scanning the inner surface W1 of the workpiece W and information on the inclination of the inner surface W1 of the workpiece W is necessary. Such information may be obtained by measuring position of a plurality of points on the inner surface W1 of the workpiece W in advance, or by utilizing design data (CAD data) of the workpiece W, thus obtaining a rough configuration of the inner surface W1.

The relative position of the stylus 102 and the inner surface W1 is the same as the first embodiment during scan of the inner surface W1 of the workpiece W. However, since the inner surface W1 is inclined in the present embodiment, the Z-axis driving mechanism as well as the X-axis driving mechanism and the Y-axis driving mechanism of the support body 23 is employed for scanning.

The other arrangement of the device of the present embodiment is the same as the first embodiment and description therefor is omitted.

Since the relative position of the stylus 102 and the inner surface W1 is the same as the first embodiment, the scanning process of the first embodiment and calculation process of the estimated surface position $R_n$ in the second and the third embodiments can be also applied to the present embodiment.

Since the tilting driver 24 and the tilting controller 33 are provided in the present embodiment, the contact portion 102A can always tap the inner surface W1 in the normal direction by obtaining the inclination of the inner surface W1 in advance.

Incidentally, the scope of the present embodiment is not restricted to the above-described embodiments, but may include modifications shown below.

Though the surface configuration measuring method according to the above respective embodiments are used for measuring inner surface of a cylindrical workpiece W, the workpiece to be measured is not restricted. For instance, the present invention may be applied for continuously measuring outer circumference of a cylindrical workpiece W or a workpiece having another complicated three-dimensional configuration.

Though the vibrator and the second vibrator are composed of the piezoelectric elements 103A and 110 in the above embodiments, the vibrator and the second vibrator may be composed of the same structure. In other words, other arrangements are possible as long as the vibrator and the second vibrator can vibrate the stylus in the axial direction and a direction orthogonal with the axis at a predetermined frequency.

Though the workpiece is measured by moving the touch signal probe in the above respective embodiments, the XYZ table for the workpiece to be put thereon may be moved for measurement. Further, the tilting driver may not be provided to the support body, but the tilting driver may be provided on the plane of the XYZ table for the workpiece to be put on for controlling the attitude of the workpiece.

Other specific arrangements and shapes may be used in implementing the present invention as long as an object of the present invention can be achieved.

Further, the specific arrangement of the contact detection probe, especially the configuration of the tip end of the stylus may be appropriately selected. When the contact portion 102A is spherical as in the first embodiment, the radius thereof is set as the offset amount D, and when the contact portion 102A has the other configuration, the offset amount may be set as a distance from a reference axis to the contact point.

Though the probe conducts tapping movement in the above respective embodiments, the present invention can be applied to measurement for profiling without the tapping movement. In this case, the second vibrator, etc. of the above respective embodiments can be omitted as designed.

What is claimed is:

1. A surface configuration measuring method for measuring a surface configuration of a workpiece having the steps of:

providing a contact detection probe having: a support body for moving in a three-dimensional space by a predetermined command velocity vector based on an outside command; a stylus being supported by the support body and having a contact portion to be in contact with the workpiece; a vibrator for resonating the stylus at a first frequency in an axial direction; and a detecting circuit for detecting change in vibration of the stylus by the vibrator, the surface configuration of the workpiece being measured by a position of the support body when the contact portion touches the surface of the workpiece;

moving the contact detection probe by the command velocity vector to touch the surface of the workpiece to be measured;

scanning the surface of the workpiece to be measured, wherein the contact detection probe is moved along the surface to be measured while controlling the distance relative to the surface to be measured so that the detected amplitude value of a detection signal outputted by the detecting circuit becomes a predetermined reference value, thus outputting the detected amplitude value and corresponding measuring position; and calculating estimated surface positions from a set of the detected amplitude values and a set of the measuring positions.

2. The surface configuration measuring method according to claim 1, wherein the command velocity vector during the scanning step is determined by equalizing a scalar of vector product of preceding value of the command velocity vector and a current command velocity vector with a difference between the detected amplitude value and the reference value multiplied by a predetermined proportionality factor.

3. The surface configuration measuring method according to claim 1, wherein the estimated surface position calculated during the calculating step is a position determined by, after determining succeeding measuring position relative to measuring position, setting a position starting from the measuring position having magnitude corresponding to the detected amplitude value and being corrected orthogonal with a straight line connecting the succeeding measuring position and the preceding measuring position.

4. The surface configuration measuring method according to claim 1, wherein the estimated surface positions calculated during the calculating step are defined as a position starting from the measuring position having a magnitude corresponding to the detected amplitude value and being the corrected orthogonal with a straight line connecting the measuring position and the preceding measuring position.

5. The surface configuration measuring method according to claim 1, wherein the estimated surface position calculated during the calculating step is defined as a position starting from the measuring position having a magnitude corresponding to the detected amplitude value and being corrected in a direction of a perpendicular drawn to a curve defined at least by three points of the measuring position and preceding and succeeding measuring position.

6. The surface configuration measuring method according to claim 3, wherein the estimated surface position is determined by adding the offset amount of the contact portion of the stylus relative to the stylus axis with a position corresponding to the detected amplitude value.

7. The surface configuration measuring method according to claim 1, wherein the scanning step of the surface to be measured is initially completed and all the necessary detected amplitude values and corresponding measuring positions are sequentially stored during the scanning step, and wherein a set of estimated surface positions is obtained based on the stored set of detected values and set of corresponding measuring values during the above calculation step.

8. The surface configuration measuring method according to claim 1, wherein the contact detection probe further has a second vibrator for resonating the stylus crosswise relative to an axis thereof at a second frequency, and wherein the detected amplitude value of the detection signal outputted by the detecting circuit is latched when vibration of the second vibrator is at a predetermined phase and the latched detected amplitude value is compared with the reference value to be controlled.

9. The surface configuration measuring method according to claim 8, wherein the stylus is vibrated by the second vibrator in a direction approximately orthogonal with the axis of the stylus and approximately orthogonal with moving direction of the support body during the scanning step.

10. The surface configuration measuring method according to claim 1, wherein the support body has a tilting driver for rotating and tilting the contact detection probe in a desired attitude and the attitude of the contact detection probe is controlled in accordance with the configuration of the workpiece by a tilting controller.

11. The surface configuration measuring method according to claim 10, wherein the tilting driver is controlled by the tilting controller so that the stylus is vibrated by a second vibrator in a normal line direction of the surface of the workpiece to be in contact with the contact portion.

12. The surface configuration measuring method according to claim 8, wherein the stylus is linearly vibrated by the second vibrator.

\* \* \* \* \*